Patented Dec. 14, 1943

2,336,481

UNITED STATES PATENT OFFICE 2,336,481

PROCESS OF MAKING SPINNING SOLUTIONS

Sverre Gulbrandsen, Woodbury, Neo S. Serinis, Gloucester, and George T. Traut, Haddon Heights, N. J., assignors, by mesne assignments, to Industrial Rayon Corporation, a corporation of Delaware No Drawing. Application April 1, 1940, Serial No. 327,362

10 Claims. (Cl. 106—167)

The present invention relates in general to the manufacture of rayon and like products by the cupro-ammonium process and in particular to the manufacture of cupro-ammonium spinning solutions for use in making rayon thread, staple, films, etc.

Among its chief objects are: to reduce to the minimum the proportion of ammonia necessary in the preparation of the solution, to produce a more complete solution, free from undissolved cellulose fibers, to simplify the procedure, and to reduce the cost of manufacture.

Various other objects and advantages of the invention will be apparent from a perusal of the following specification.

In the cupro-ammonium process ammonia is one of the main items of cost. In the early days of the industry, a very large amount of this material was used, upward of 4 lbs. anhydrous ammonia per pound of rayon. This extravagant use of ammonia was partly due to a misconception of the process of solution. Apparently it was thought that a clear solution of copper hydroxide in ammonia (cupro-ammonium hydroxide) had to be used as a solvent for the cellulose, this apparently being suggested by the well-known Schweitzer's reagent. The clear cupro-ammonium hydroxide solution was prepared by bubbling air through a tower containing ammonia and scrap metallic copper. In that process the solution in the tower was cooled, partly to avoid the loss of too much ammonia when the air was bubbled through it, and partly because the solubility of copper hydroxide in ammonia is materially increased at low temperature. However, due to its low solubility even at the lowered temperature, it was not possible to dissolve more than about 2½% copper hydroxide, which solution could dissolve only about 4% cellulose. Since the ammonia solution had to be strong (20% or more) to dissolve even this small amount of copper, the ammonia used per lb. of cellulose was very high.

Another variant of the process was to dissolve copper sulphate in ammonia to form cupro-ammonium sulphate. This solution was strongly cooled and then caustic soda added, thereby forming clear cupro-ammonium hydroxide solution and sodium sulphate, the latter being removed as crystals of Glauber's salt. In this case, also, the amount of ammonia used was very great.

Later it was recognized that it was not necessary to produce a clear solution of cupro-ammonium hydroxide to dissolve the cellulose, but that copper hydroxide and cellulose could be added together to aqueous ammonia, thereby producing a solution of considerably greater concentration than in the earlier processes. While copper hydroxide by itself is only sparingly soluble in ammonia, much larger quantities can be dissolved in the presence of cellulose, due to the formation of a copper-cellulose addition compound which is soluble in ammonia. In this way, the ammonia consumption per pound of cellulose was reduced to about one-half of that previously used. One difficulty was with the quality of the copper hydroxide. This was prepared by precipitating a solution of copper sulphate with caustic soda, and the product so formed had the disadvantage of being very voluminous and gelatinous, moreover, it was unstable, tending to split off water, thus forming dark copper oxide. Immediate use of the freshly precipitated hydroxide was therefore necessary: It was usually mixed with cellulose pulp in a hollander, then filtered. The filtered wet mixture of cellulose and copper hydroxide was then dissolved in ammonia. In such process so much water had to be added with the cellulose and the bulky copper hydroxide that it was not possible to produce the concentration necessary for a very low ammonia consumption.

Later, the quality of copper hydroxide was much improved. Methods were developed for making a very dense and extremely stable product, for example, that disclosed in Patent 2,206,889 issued July 9, 1940, on the application of Sverre Gulbrandsen, Serial No. 209,366, filed May 21, 1938. This made it possible to prepare a very concentrated cellulose solution of the consistency of a dough and containing as much as 20% cellulose. Such a solution could be made with as little as one pound of anhydrous ammonia per pound of cellulose. It was also found that after such a solution was made and before dilution, a portion of the ammonia could be removed by vacuum and recovered as disclosed in the patent to Furness, No. 2,047,466, granted July 14, 1936.

Some of the items of substantial expense in the above noted process are that very heavy and costly mixers must be used to make the concentrated, heavy dough-like solution of cellulose, and that the power consumption is high, both for the mixers and the vacuum pumps. Also there are losses of ammonia by volatilization due to working with such concentrated solutions, as well as imperfect absorption of the ammonia removed by vacuum.

To the best of our knowledge no one has dissolved cellulose in ammonia and copper hydroxide, with an ammonia consumption of substantially less than one pound of anhydrous ammonia per pound of cellulose. Where a smaller consumption has been attained, it has been accomplished by removing ammonia from the finished solution by vacuum. Apparently this limitation of solution is caused by the difficulty of exceeding a certain concentration of cellulose in the strong ammonia solutions hitherto used for dissolving the cellulose, because with a large amount of ammonia per unit volume of liquid, a large amount of cellulose must be added to bring the ratio of cellulose to ammonia to near 1 to 1. Therefore, with such higher concentrations, the solution would approach a solid state, making stirring and complete solution impracticable.

According to our invention, we make a spinning solution by bringing together and subjecting to a temperature approaching 0° centigrade, a solution of ammonia in water of a strength substantially less than 20% ammonia, cellulose and copper hydroxide, and in which the ratio of anhydrous ammonia to anhydrous cellulose in the batch is substantially less than (from .5 to .8 in the example given below) one (1), agitating the mixture until it is dissolved while maintaining this temperature. Without evacuation of any ammonia and after dilution, the solution is then filtered. The anhydrous-ammonia-cellulose ratio is preserved. The solution is diluted, if necessary, before or after filtration to adjust the cellulose for spinning. Other features of the invention will be clear from the following.

The cellulose used may be either bleached linters or a high grade wood-pulp. Preferably the cellulose should have a materially lower viscosity characteristic than that used for the Viscose process or the "stretch-spinning" cupro-ammonium process. This lower viscosity characteristic is of appreciable assistance in rendering possible very low ammonia and copper consumptions, and furthermore results in a solution which is not too viscous to be stirred effectively at the low temperatures employed.

The copper hydroxide used is preferably the pure stable and dense variety described in the Gulbrandsen patent above referred to. In the new process, it is found that the amount of copper hydroxide may be measurably reduced, as compared with previous process. In prior processes, such as those discussed above, the $$\frac{Cu(OH)_2}{Cellulose}$$

ratio usually approaches .70. In applicant's process, this ratio has been reduced to and may be consistently held at any point in approximately a range of between .50 and .60.

In place of copper hydroxide, a pure basic copper sulphate, such as for instance that described in the application above referred to, may be used. This basic sulphate is composed of three equivalents of copper hydroxide and one equivalent of copper sulphate. When using this product, enough caustic soda is added to the batch to convert the copper sulphate content of the basic sulphate to copper hydroxide. This caustic soda is added in the form of a solution, and the amount is one-quarter the chemical equivalent of the total copper. A little sodium sulphate is formed in this reaction; this remains in the cellulose solution and has no deleterious effect.

The process is carried out in a jacketed tank equipped with any form of agitator of simple construction and moving at relatively low speed. Moderate agitation rather than high agitation is used. The power consumption is therefore small and little mechanical heat is produced. Brine or other cooling medium is circulated through the jacket so as to maintain a low temperature during solution. An ideal operating temperature approaches 0° to 2° C., though gradually decreasing advantageous results may be attained under higher temperatures extending up to say 10° C. Temperatures considerably lower than 0° to 2° C. are highly advantageous.

The following examples illustrate the operation of this process:

*Example I*

| | |
|---|---|
| Cellulose (4% moisture) | 460 g.=441 g. anhydrous cellulose |
| Aqueous ammonia (29%) | 1,045 g.=303 g. anhydrous $NH_3$ |
| Water | 2,000 g. |
| Copper hydroxide | 237 g. |
| | 3,742 g. |

The water and ammonia are first added in the jacketed tank and brought to 0° C. Enough cellulose is added to make a slurry; and then the copper hydroxide and all the remaining cellulose.

After stirring 3 hours at 0° to 2° C., the solution becomes completed without any ammonia evacuation. The completed solution has the following composition:

| | | |
|---|---|---|
| Cellulose | percent | 11.78 |
| $NH_3$ | do | 8.09 |
| $Cu(OH)_2$ | do | 6.33 |
| $\frac{NH_3}{\text{Anhydrous cellulose}}$ | | .687 |
| $\frac{Cu(OH)_2}{\text{Anhydrous cellulose}}$ | | .538 |
| $NH_3$ in liquid solvent | percent | 9.95 |

The completed solution may be diluted with water to whatever concentration desired for spinning, as, for example, 4% cellulose.

*Example II*

| | |
|---|---|
| Cellulose (4% moisture) | 1,062 g.=1019 g. anhydrous cellulose |
| Aqueous ammonia (29%) | 1,883 g.=546 g. anhydrous $NH_3$ |
| Water | 6,250 g. |
| Copper hydroxide | 540 g. |
| | 9,735 g. |

The ingredients are added in a manner similar to that in Example I.

After stirring 6 hours at 0° to 2° C. the solution is complete and has the following composition:

| | | |
|---|---|---|
| Cellulose | percent | 10.47 |
| $NH_3$ | do | 5.61 |
| $Cu(OH)_2$ | do | 5.55 |
| $\frac{NH_3}{\text{Anhydrous cellulose}}$ | | .536 |
| $\frac{Cu(OH)_2}{\text{Anhydrous cellulose}}$ | | .530 |
| $NH_3$ in liquid solvent | percent | 6.67 |

The completed solution may be diluted with water to the concentration desired for spinning.

*Example III*

| | |
|---|---|
| Cellulose (7.4% $H_2O$) | 487 g.=451 g. anhydrous cellulose |
| Aqueous ammonia 29% | 810 g.=235 g. anhydrous $NH_3$ |
| Water | 2,350 g. |
| Basic copper sulphate | 308 g.=251 g. $Cu(OH)_2$ |
| Caustic soda solution 24% | 215 g.=51.6 g. NaOH |
| | 4,170 g. |

The water and ammonia are added first and brought to 0° C. Enough cellulose is added to produce a slurry; then the basic copper sulphate and all the remaining cellulose except 125 g. Then the caustic soda solution is added and finally the remainder of the cellulose. The solution is complete 2 hours after the last addition of cellulose. The composition of the finished solution is:

| | | |
|---|---|---|
| Cellulose | per cent | 10.81 |
| $NH_3$ | do | 5.63 |
| $Cu(OH)_2$ | do | 6.02 |
| $\frac{NH_3}{\text{Anhydrous cellulose}}$ | | .521 |
| $\frac{Cu(OH)_2}{\text{Anhydrous cellulose}}$ | | .556 |
| $NH_3$ in liquid solvent | per cent | 7.00 |
| $Na_2SO_4$ | do | 2.17 |

The small amount of sodium sulphate present in the solution has no deleterious effect.

This solution also may be diluted with water for spinning.

The solutions made by this process are remarkably complete and free from undissolved cellulose fibers, making the filtration very simple, and the spinning very uniform.

The process improves over the known processes in its extreme simplicity, the short time required for its completion, its great economy in the use of ammonia without necessity for removal of ammonia by vacuum and the material saving in power due to the relatively high degree of fluidity of the mixture operated upon.

The process further improves over the known processes in eliminating the use of heavy-duty mixers such, for example, as the heavy-duty mixers of the dough-mixer type, and powerful agitators or mixers of other types. Light-duty and low-power mixers and agitators have been used in other processes, it is true, but in these cases solutions were used having a high anhydrous ammonia cellulose ratio. According to our method, the spinning solution is produced directly from the wood pulp without the necessity for any maceration, and without the necessity for more than mild agitation. There results a saving in power, and because saving in power avoids the resultant heat of the mix, further aids in the saving of ammonia.

A solution can be made from wood pulp with almost but not quite the same facility as it can be made from cotton linters, and when completed, has the same perfection of quality as that made from cotton linters.

Finally this more economical process results in a spinning solution of markedly improved quality. The cellulose solution is distinctly more perfect, containing considerably less undissolved fiber, and being characterized by a considerably greater uniformity of dissolution. Trouble with clogged filters and spinnerets is, therefore, noticeably reduced, and the frequency of cleaning of filters is not so great.

Yet further, our process results in a saving of caustic and a saving of sulphuric acid in the setting and copper removal operations. This is for the reason that in using lower ammonia cellulose ratio, a setting bath may be used containing a lower concentration of caustic soda. This in turn results in a saving of sulphuric acid in the washing process since less total alkali is present to be neutralized.

The aqueous ammonia formerly used for making cupro-ammonium solutions of cellulose was usually of a concentration of 20 to 30% $NH_3$. In the present process, the ammonia may be less than half that concentration, usually not more than 7% to 10% though it may be yet lower.

While the outstanding economy of this process is believed to be the saving in ammonia, the elimination of dough-mixing, reduction of power for agitation, elimination of the evacuation step, of power required for ammonia evacuation, the saving of time and expense in changing of filters and cleaning of spinnerets, the saving in caustic and acid, are economies of substantial consequence. The number of steps or operations and the time are cut down very much. Collectively the reduction of filtration and spinneret troubles due to imperfect solutions, together with the consistent uniformity of high quality of the solution, are believed by us to produce a higher quality yarn.

By appropriately relatively adjusting the degree of nearness of the temperature to the temperature of 0° centigrade, the ratio of anhydrous ammonia to cellulose with reference to the low range which we have determined, and the strength of the ammonia solution, the very maximum of efficiency of utilization of our new process can be attained.

It is particularly to be noted that the fluidity and viscosity of the mix is such that a thorough-going admixture may be had without dough-mixing. Further, the initial admixture of cellulose and ammonia to produce a slurry, is quite an advantageous step in insuring against the heavy copper hydroxide aggregating at the bottom of the tank, as it would if it were first added to the ammonia, and either delaying full admixture or requiring such high agitation as would unduly heat the mixture in the same manner as would dough-mixing. Mild but persisting agitation is a contributing feature of the invention, but we may in the early stage of the mixture commence by agitating relatively heavily just after the copper hydroxide is added, and for that relatively short time until all the cellulose is added, but thereafter reduce to and continue to completion under relatively mild agitation.

The anhydrous-ammonia-cellulose ratio of the original mix is maintained not only during the mix at the temperature approaching 0° centigrade, but also after the solution of the cellulose is complete, and its maintenance until the solution is spun, is a distinguishing characteristic of the solution we produce. After the solution is made it is stored at room temperatures.

Dilution, if necessary to reduce to that concentration of cellulose required for spinning, is done before filtration. However, our invention contemplates an initial concentration of cellulose, such that dilution may not be necessary. This is achieved by using initially a sufficiently dilute concentration of ammonia. This feature of the invention may be found particularly useful in the higher concentration of cellulose useable for certain spinnings. A cellulose concentration of 6.2% is common, but for some purposes concentrations as high as 8% or over, are conceived to be useful.

The use of wood pulp also constitutes a feature of our invention. We may introduce it in strip or sheet form, both in the initially introduced quantity and in the finally introduced quantity, thus saving altogether the need for maceration.

While we have herein described certain specific examples of the carrying out of our invention, it is to be understood that the invention is not limited to such specific examples, but contemplates all modifications and variants thereof as fall fairly within the generic spirit of our invention, irrespective of the circumstantial terminology of the claims appended hereto.

What is claimed is:

1. A method of making a cupro-ammonium cellulose spinning solution, in which a mixture of an aqueous solution of ammonia, cellulose and copper hydroxide having an anhydrous ammonia/anhydrous cellulose ratio of .5 to .8 and a copper hydroxide/anhydrous cellulose ratio of less than and approximately .6 is agitated until the cellulose is dissolved while maintaining the mixture by external cooling at a temperature of less than 10° C.

2. A method of making a cupro-ammonium cellulose spinning solution, in which a mixture of an aqueous solution of ammonia, cellulose and copper hydroxide having an anhydrous ammonia/anhydrous cellulose ratio of .5 to .8 and a copper hydroxide/anhydrous cellulose ratio of less than and approximately .6 is agitated until the cellulose is dissolved while maintaining the mixture by external cooling at a temperature in the neighborhood of 0° C.

3. A method of making a cupro-ammonium cellulose spinning solution, in which a mixture of an aqueous solution of ammonia, cellulose and copper hydroxide having an anhydrous ammonia/anhydrous cellulose ratio of .5 to .8 is agitated until the cellulose is dissolved while maintaining the mixture by external cooling at a temperature of less than 10° C., and in which the aqueous solution of ammonia has a strength of 7% to 15%.

4. A method of making a cupro-ammonium cellulose spinning solution, in which a mixture of an aqueous solution of ammonia, cellulose and copper hydroxide is agitated until the cellulose is dissolved while maintaining the mixture by external cooling at a temperature of less than 10° C., which mixture has an anhydrous ammonia/anhydrous cellulose ratio of .5 to .8 and the aqueous solution of ammonia has a strength of from 7% to 15%, and in which the copper hydroxide is formed in the cellulose solution itself by the treatment of initially introduced basic copper sulphate with enough alkaline hydroxide to convert the sulphate part of said basic copper sulphate to copper hydroxide.

5. In the art of making rayon, the method of making a spinning solution according to claim 1, and thereafter maintaining the ratio of anhydrous ammonia to anhydrous cellulose which prevails in the batch until and during the spinning operation.

6. The method as claimed in claim 1 in which after the solution is complete, it is diluted and filtered to make it ready for spinning while the ammonia-cellulose ratio is kept at least at about the original level.

7. A method according to claim 1 in which a considerable portion of the cellulose is first added to the solution of ammonia in water to produce a slurry, then the copper hydroxide is admixed therewith, and thereafter the remainder of the cellulose is added.

8. A method according to claim 1 in which a considerable portion of the cellulose is added to the solution of ammonia in water before copper hydroxide is introduced, thereafter the copper hydroxide is introduced, then the mixture is heavily agitated for a short time, the remainder of the cellulose is introduced, and thereafter the agitation is reduced to and maintained at a mild degree.

9. A method according to claim 1 in which the elements of the solution are introduced to each other and admixed, and are agitated and mixed solely by agitative current flows impressed upon the liquid of the solution.

10. In the art of making rayon, the step of initially producing a spinning solution according to claim 1 by admixing the elements of the solution and theerafter furthering the solution to completion under but mild agitative power and negligible resultant heating of the mixture, and thereafter maintaining the initial ratio of anhydrous ammonia to anhydrous cellulose obtaining in the batch and storing at prevailing room temperatures until and during the use of the solution for a spinning operation.

SVERRE GULBRANDSEN.
NEO. S. SERINIS.
GEORGE T. TRAUT.

CERTIFICATE OF CORRECTION.

Patent No. 2,336,481. December 14, 1943.

SVERRE GULBRANDSEN, ET AL.

It is hereby certified that error appears in the printed specification of the above numbered patent requiring correction as follows: Page 4, second column, line 24, claim 10, before "producing" strike out "initially--; line 25, same claim, before "admixing" insert --initially--; and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.